United States Patent [19]

Leonard et al.

[11] 4,062,203
[45] Dec. 13, 1977

[54] TORQUE LIMITING DEVICE

[75] Inventors: Ralph R. Leonard, Kent; Ted J. Taylor, Seattle, both of Wash.

[73] Assignee: Industrial Analytics Inc., Kent, Wash.

[21] Appl. No.: 651,283

[22] Filed: Jan. 20, 1976

Related U.S. Application Data

[63] Continuation-in-part of Ser. No. 506,601, Sept. 16, 1974, Pat. No. 3,942,337.

[51] Int. Cl.² ............................................. A01d 35/26
[52] U.S. Cl. ................................................... 64/29
[58] Field of Search ................. 64/29; 192/56; 81/52.4

[56] References Cited

U.S. PATENT DOCUMENTS

| | | | |
|---|---|---|---|
| 1,828,370 | 10/1931 | Huddle | 64/29 |
| 2,576,069 | 11/1951 | Hoag et al. | 64/29 |
| 3,596,446 | 8/1971 | Bryan | 64/29 |

FOREIGN PATENT DOCUMENTS

| | | | |
|---|---|---|---|
| 113,687 | 8/1941 | Australia | 64/29 |

Primary Examiner—Samuel Scott
Assistant Examiner—R. C. Turner
Attorney, Agent, or Firm—Conrad O. Gardner

[57] ABSTRACT

A torque limiting device employing a clutch disposed within a cylindrically shaped housing and coupling first and second members coaxially mounted in the respective ends of the cylindrically shaped housing. The first and second members are rotatably mounted in the housing and adapted for engagement with the torqueing device and work respectively or vice versa. Manual rotation of one housing section relative to the other housing section adjusts to predetermined maximum value the torque which is transmitted the device, viz., between the first and second members. To enable bidirectional torque limiting, a third member is disposed between said first and second members.

3 Claims, 9 Drawing Figures

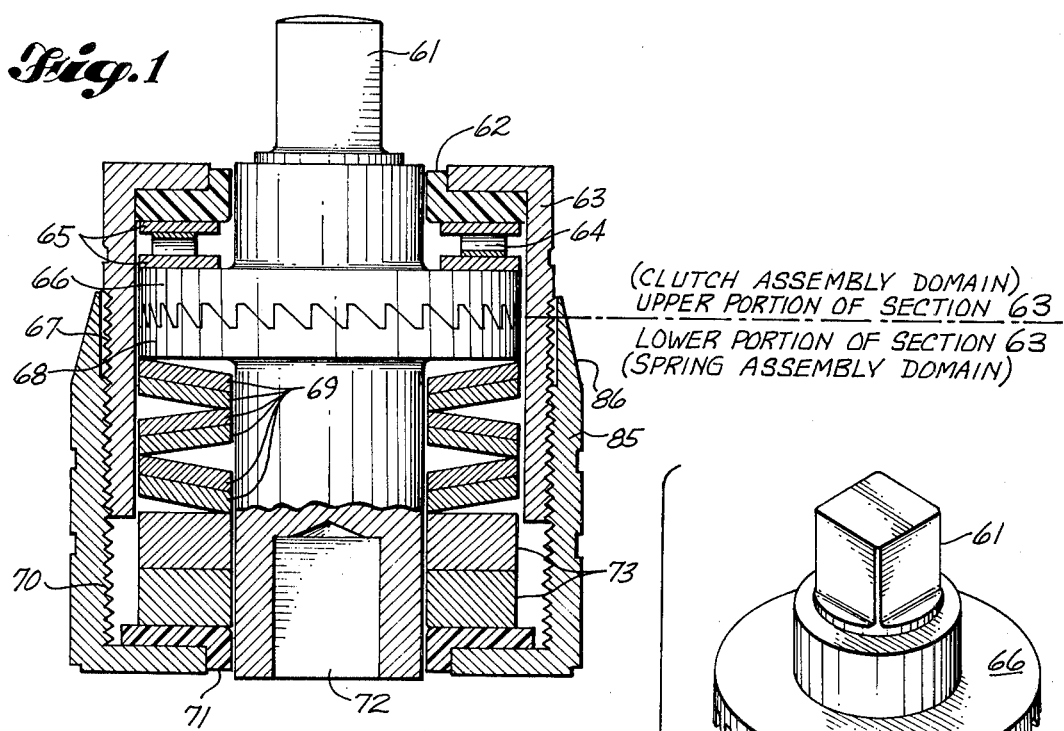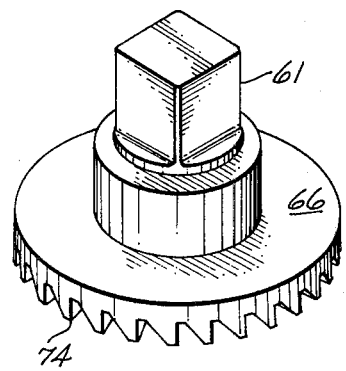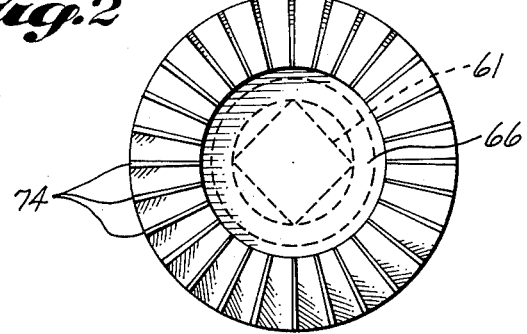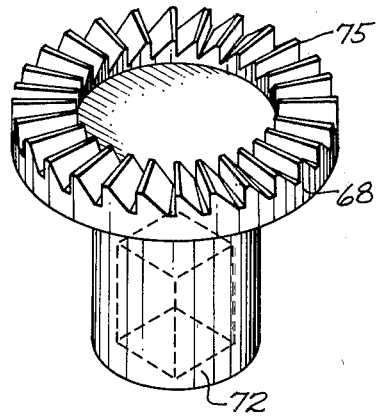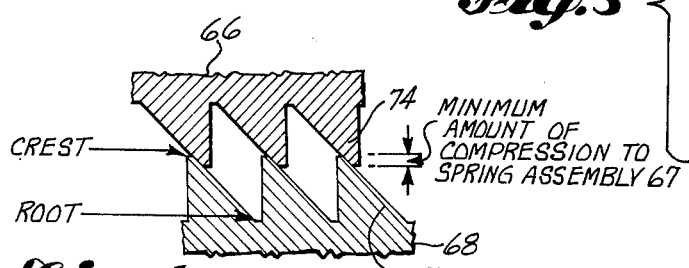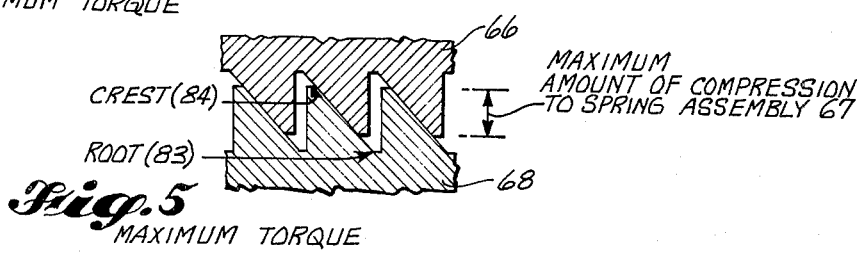

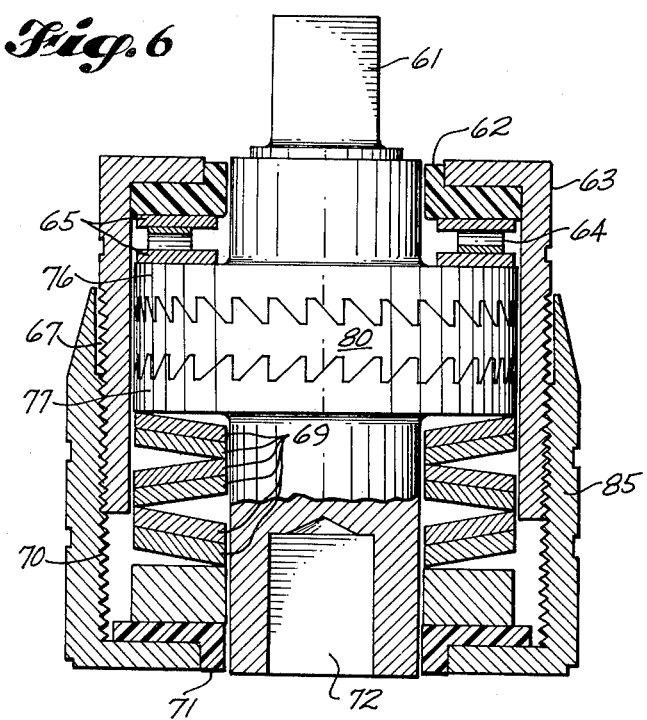
Fig. 6
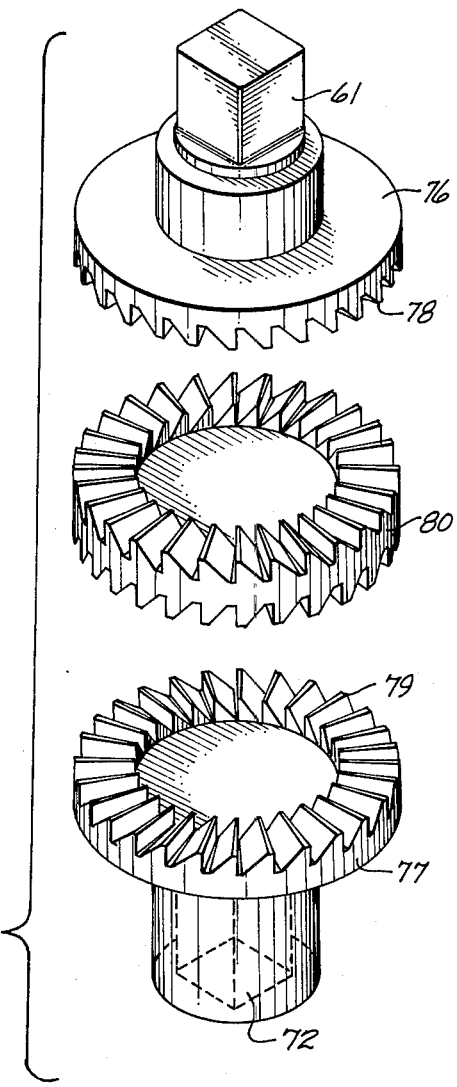
Fig. 7
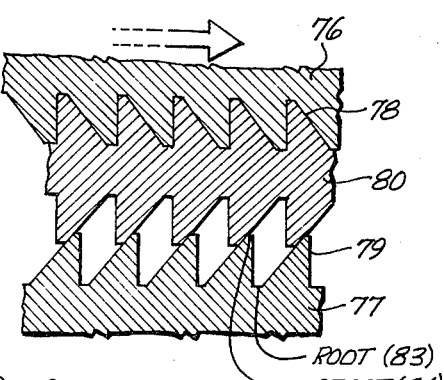
Fig. 8
Fig. 9

TORQUE LIMITING DEVICE

This application is a continuation in part of our application Ser. No. 506,601 filed Sept. 16, 1974 now, U.S. Pat. No. 3,942,337.

The invention relates to a torque limiting device, and more particularly to such a device which is manually adjustable to the maximum torque desired and may be coupled between torque transmitting source e.g. a handle which is manually operated and a load e.g. a socket or other work.

The prior art includes a device such as shown in U.S. Pat. No. 2,576,069 to Hoag et al which shows loading of a spring by turning the housing and may be contrasted to the present device wherein the volume of the clutch assembly domain is varied by hand rotation of one housing section relative to the other thereby setting the gap between the first and second clutch members, but the volume of the spring assembly domain remains constant during the torque setting operation and is not preloaded.

Accordingly, it is an object of this invention to provide a compact, self-contained torque limiting device having a variable torque limit easily set by hand independent of the magnitude of the torque by manipulation of the housing and which can be readjusted without uncoupling the device from the torqueing force driving it and the object being torqued.

It is another object of this invention to provide a torque limiting device which may be inserted between a torque transmitting source (handle) and a torque receiving device (socket) and which will limit torque in either a clockwise or counterclockwise direction.

It is a further object of this invention to provide a torque limiting device which incorporates repetitive reset when the torque limit set has been exceeded.

It is still another object of this invention to provide a hand adjustable torque limiting device wherein the torqueing force may be coupled at either end of the cylindrical housing with the work coupled at the opposite end.

It is yet another object of the present invention to provide a hand adjustable torque limiting device wherein the housing may be held fixed as by the hand of an operator while guiding the application of the torqueing force through the driven rotating member at one end of the housing to a receiving rotating member at the other end of the housing connected to the work.

It is another object to provide a torque limiting device having means for setting a torque limit by adjusting the volume of the clutch assembly domain and consequent gap provided between clutch members without preloading of the compression spring assembly for resisting applied torque.

It is a yet further object of the present invention to provide a torque limiting device which automatically locks on the selected torque setting upon application of torque and unlocks upon release thereof.

It is still a further object of the present invention to provide means in a torque limiting device for adjusting torque limit without application of compressive forces to the compression spring assembly thereby eliminating calibration errors arising from preloading of compression springs over extended periods of time when said device is left in a torque limit set condition.

According to the present invention the torque limiting device comprises a clutch assembly domain where volume is easily varied by hand rotation of one section of the cylindrically shaped housing relative to the other to set the torque limit. A spring assembly domain is not preloaded during torque setting, the volume thereof being varied only during the application of torque.

In a preferred embodiment the compressive spring force is provided by a stack of compression springs coaxially disposed about the central axis of the cylindrical housing forming the spring assembly domain intermediate the clutch member disposed for axial movement and an inner end wall of said cylindrical housing, the volume of the spring assembly domain being varied during application of torque but remaining constant during torque limit setting.

The present invention will be further described by way of example with reference to the accompanying drawings in which:

FIG. 1 is a frontal elevational view of a unidirectional embodiment of the present handleless torque wrench;

FIG. 2 is illustrative of the sawtooth face of the clutch disks shown in FIG. 3;

FIG. 3 is an exploded isometric view of the internal clutching mechanism portion of the device shown in FIG. 2, the direction of the clutch teeth as shown being illustrative of a first direction which however can be reversed for counter clockwise application of torque;

FIG. 4 is a view taken in section of a portion of the clutch mechanism shown in FIG. 3, the disposition of parts being illustrative of the moment of minimum application of torque;

FIG. 5 is a view taken in section of a portion of the clutch mechanism shown in FIG. 3, the disposition of parts illustrative of the moment of maximum application of torque;

FIG. 6 is a frontal elevational view of a bidirectional embodiment of the handleless torque wrench shown in FIG. 1;

FIG. 7 is an exploded isometric view of the internal clutching mechanism portion of the device shown in FIG. 6;

FIG. 8 is a view taken in section of a portion of the clutch mechanism shown in FIG. 7, the disposition of parts illustrating a clockwise application of torque; and FIG. 9 is a view taken in section of a portion of the clutch mechanism shown in FIG. 7, the disposition of parts illustrating a counter clockwise application of torque.

Turning now to FIG. 1 and comparing with FIG. 1 of our aforementioned U.S. patent application Ser. No. 506,601 it will be noted that present parts 61, 63, 85, and 72 correspond identically in structure and mode of operation to parts 3, 1, 2, and 4 of FIG. 1 of the aforereferenced application. In FIG. 1 of the present application, the cylindrically shaped housing is seen to comprise an inner housing section 63 which has an outer threaded surface 67 (see also FIG. 6) on the cylindrical portion thereof which is rotatably supported within the overlying mating inner threaded surface 70 (see also FIG. 6) of the outer housing section 85. A first member, male clutch adaptor 61 is shaped into an engaging stud for receiving a standard socket or handle of desired length. The first member is disposed coaxially about the central axis of the device (see also FIGS. 3 and 7) and projects from the end of the cylindrically shaped housing section 63 while the other end of the first member 61 within the cylindrically shaped housing 63 includes a male clutch disk 66 shaped with thirty (30) saw teeth 74 which is fixed against axial movement since at least a certain minimal force is exerted by anti-rattle spring 64. Anti-rattle spring 64 is sandwiched between two isolation washers 65 (see also FIG. 6) and exerts a small compressive force through clutch member 61, engaging female clutch member 72 thereby preventing the clutch assembly from rattling.

The hereinafter discussed principles of operation of the present torque limiting device apply to both the unidirectional embodiment shown in FIG. 1 and the bidirectional embodiment for torque limiting shown in FIG. 6. Within the cavity of the cylindrically shaped housing comprising the inner walls of inner housing section 63 and the inner walls of outer housing section 85 there are found two structurally defined domains:

1. The clutch assembly domain which is enclosed by the underside and inner shaft of male clutch disk 66 and the inner walls of inner housing section 63 and bushing 62 as shown in FIG. 1.

2. The spring assembly domain which is enclosed by the flat underside and inner shaft of female clutch disk 68, and the inner walls of outer housing section 85 and spacers 73.

CLUTCH ASSEMBLY DOMAIN

The volume of the clutch assembly domain can be varied: that is, increased or decreased by the amount of the anti-rattle spring 64, by turning outer housing section 85 relative to inner housing section 63. Thus, setting the torque by turning these housing sections relative to one another varies the volume within the hereinabove defined clutch assembly domain. The higher the torque setting, the further outer housing section 85 is threaded into inner housing section 63 thereby decreasing the volume of the clutch assembly domain by the amount of depression capable of anti-rattle spring 64, a very light wave spring sufficient to take up slack volume and prevent rattling of parts in the clutch assembly domain. The lower the torque setting, the further outer housing section 85 is threaded out of inner housing section 63 thereby allowing anti-rattle spring 64 to assume its normal configuration at minimum torque setting.

SPRING ASSEMBLY DOMAIN

The volume of the spring assembly domain is also a variable one but remains constant during the torque setting mode. At no time during torque setting are the compression springs 69 preloaded, loaded or deformed from their normal configuration. The volume of the spring assembly domain is varied only during the application of torque, the volume thereof varying between the unloaded condition of compression springs 69 to the fully loaded (compressed) condition of compression springs 69.

OPERATION AT MINIMUM TORQUE

Outer housing 85 is threaded out of inner housing 63 until the vernier on the periphery 86 of housing 85 is indicative of minimum torque. In such case, the clutch assembly domain is at its maximum volume with anti-rattle spring 78 in its fully extended (normal) configuration. If a force is now applied to a handle (not shown) attached to male clutch adaptor 61 and a fastener attached to female clutch adaptor 72, male clutch disk 66 and saw teeth 74 will climb the slope of opposing female clutch disk 68 and saw teeth 75 until anti-rattle spring 78 is fully compressed. This condition allows for maximum gap to form between the opposing clutch teeth as shown in FIG. 4. At this point, the clutch assembly domain is at its ultimately compressed volume and cannot be compressed any further. However, with further application of handle force, male clutch teeth 74 now force opposing female clutch disk 68 to move into the spring assembly domain, compressing for the first time spring assembly 69, an amount equal to the torque setting on the vernier at 86. At the torque setting shown on the vernier, clutch teeth 74 and 75 crest each other and drop off on the back side of teeth 74 and 75 thereby unloading spring assembly 69. The clutch teeth now reposition themselves in the root of the next tooth. The spring assembly domain is once again of normal volume and compression springs 69 are of normal configuration.

OPERATION AT MAXIMUM TORQUE

Outer housing 85 is threaded further into inner housing 63 until the vernier on the periphery 86 of housing 85 indicates maximum torque. In this case, the clutch assembly domain is at its minimum volume with anti-rattle spring 78 fully compressed. If a force is now applied to a handle (not shown) attached to a male clutch adaptor 61 and a fastener (not shown) attached to a female clutch adaptor 72, male clutch saw teeth 74 will climb the slope of opposing female clutch saw teeth 75 for a very minimal distance, since anti-rattle spring 78 was previously compressed by the torque setting. The preset condition of a fully compressed anti-rattle spring 78 allows for minimal gap to form between clutch teeth 74 and 75 (see FIG. 5). If the handle force is applied beyond this preset condition, male clutch teeth 74 forces opposing female clutch disk 68 to move into the spring assembly domain, compressing for the first time spring assembly 69, an amount equal to the torque setting on the vernier. At the torque setting appearing on the vernier, clutch teeth 74 and 75 crest each other and drop off on the back side of their respective teeth thereby unloading spring assembly 69. The clutch teeth now reposition themselves in the root of the next tooth. The spring assembly domain is again of normal volume and compression springs 69 of normal configuration.

BIDIRECTIONAL OPERATION

Turning now to the bidirectional embodiment shown in FIG. 6, it will be observed that male clutch disk 76 and female clutch disk 77 are equipped with bidirectional saw teeth 78 and 79 design. These teeth are not mating but symmetrically opposed to each other. A third member, waffle member 80 is disposed between female clutch disk 77 and male clutch disk 76 so as to be sandwiched between disks 76 and 77 and mating uniformly with the saw teeth of both (see FIG. 7).

The special design of waffle shaped member 80 is such that root 83 and crest 84 (see FIG. 9) of each of the thirty (30) teeth of waffle shaped member 80 are parallel to the male and female clutch disk surfaces of disks 76 and 77.

BIDIRECTIONAL OPERATION (Clockwise rotation)

Assume a handle (not shown) attached to male clutch adaptor 61 and a fastener attached to female clutch adaptor 72. The handle could have been attached to female clutch adaptor 72 and the fastener attached to male adaptor 61 which would not have affected the clockwise rotation. As the male clutch disk is forceably rotated in a clockwise direction, the bidirectional was tooth design of clutch disk 76 slips over the mating slopes of waffle member 80 while the opposing teeth of waffle member 80 lock with those of clutch disk 77 (see FIG. 8).

BIDIRECTIONAL OPERATION (counterclockwise rotation)

Again, assume a handle (not shown) attached to male clutch adaptor 61. As male clutch disk 76 is foreceably rotated in a couterclockwise (CCW) direction, waffle member 80 slips over female disk teeth 79 while the opposing teeth of waffle member 80 lock with those of clutch disk 76 (see FIG. 9).

BIDIRECTIONAL OPERATION (Minimum and Maximum Torque)

The principles are the same as explained under "clutch assembly domain," "spring assembly domain," "minimum torque," and "maximum torque."

AUTOMATIC LOCK FEATURE

The principles hereinafter discussed are applicable both to the undirectional and bidirectional devices. Assume any torque setting within the operating range of the device. Since there is no internal pressure at the time of setting torque (other than flexing of very light anti-rattle spring 64 utilized to take up slack volume), torque settings are made by easily turning outer split housing section 85 with respect to inner split housing section 63 from the minimum to the maximum torque settings of the operating range of the device. If a force is now applied to a handle (not shown) attached to male clutch adaptor 61 and a fastener (not shown) attached to a female clutch adaptor 72, male clutch disk 66 and related saw teeth 74 will climb the opposing teeth until anti-rattle spring 78 is fully compressed. At this point, the clutch assembly domain is compacted to reach its minimum volume and cannot be compressed any further. A continued application of a turning force applied to the handle will immediately lock the torque setting since female clutch disk 68 invades the spring assembly 69 and bringing to bear a very high internal pressure against both units of the split inner and outer housing sections 63 and 85.

In reference to the figures and descriptions relating thereto shown in our aforementioned application Ser. No. 506,601 herein incorporated by reference, similarity in mode of operation of said structure with the present disclosed structure will be noted and distinct departure in mode of operation and structure will also be noted, e.g. an embodiment of the present device providing for bidirectional application of torque limiting, and saw tooth design of the present clutch members.

An operating embodiment of the present invention provided a torque range from 15 to 160 ft-lbs with one-half inch drive handle (not shown).

The embodiment of FIGS. 1 to 5 is designed for torque application in a counterclockwise direction and as noted with respect to the embodiment shown in FIG. 6 to 9, bidirectional adaptation requires only the use of one additional part. The present torque limiting device as hereinbefore mentioned can be left at any torque setting when not in use without loss of calibration.

It should be further noted that be setting the torque at a very low value, the embodiment shown in FIGS. 1-5 can be utilized as a ratcheting device in a direction opposite to that of the torqueing direction, however this is not possible with the embodiment shown in FIGS. 6-9.

What is claimed is:

1. A torque limiting device comprising a means for selecting any torque limit value between minimum and maximum torque limit capabilities of said device comprising an input shaft adapted for transmission of torque by means of a supplemental torqueing tool;

an output shaft adapted for coupling to a workpiece;

a housing surrounding said input and output shafts, said housing comprising first and second sections, one of said sections rotatable relative to the other section;

a clutch assembly disposed in said housing and interconnecting input and output shafts, said clutch assembly including two clutch members operative to separate and break the interconnection between said input-output shafts when the torque resistance to rotation of said input or output shaft exceeds a preselected torque limit value;

an anit-rattle spring means within the clutch-assembly-domain of said housing of one of said housing sections relative to the other for providing a small compressive force through a first of said two clutch members against the second of said two clutch members throughout the adjustable torque limiting range of said device to restrict the play between the first and second clutch members and, further including a compressive spring assembly within the assembly-spring-domain of said housing for resisting separation of the variable gap existing between said two clutch members when the applied torque is transmitted by said input shaft to said output shaft.

2. A torque limiting device comprising a means for selecting any torque limit value between minimum and maximum torque limit capabilities of said device comprising an input shaft adpated for transmission of torque by means of a supplemental torqueing tool;

an output shaft adapted for coupling to a workpiece;

a housing surrounding said input and output shafts, said housing comprising first and second sections, one of said sections rotatable relative to the other section;

a two part cylindrical housing having one part hand rotatable to the other part for changing the gap which exists between the facing surfaces of said first and second clutch members when the torque settings of the device are being manipulated wherein there is no applied external force on the input shaft;

a clutch assembly comprising a first and second clutch member having opposing facing surfaces, said first clutch member, protruding shaft, and inner surface of said housing enclosing a volume comprising a clutch-assembly-domain, said second clutch member, protruding shaft, and inner surface of said housing enclosing a further volume comprising a spring-assembly-domain;

an anti-rattle spring means within said clutch-assembly-domain for providing a small compressive force through a first of said two clutch members against the second of said two clutch members throughout the adjustable torque limiting range of said device to restrict the play between the first and second clutch members; and, further including a compressive spring assembly within said spring-assembly-domain for resisting separation of the variable gap existing between said two clutch members when the applied torque is transmitted by said input shaft to said output shaft.

3. A torque limiting device comprising a means for selecting any torque limit value between minimum and maximum torque limit capabilities of said device comprising first and second clutch members having opposing facing surfaces;

an input shaft adapted for transmission of torque by means of a supplemental torqueing tool;

an output shaft adapted for coupling to a workpiece;

a two section cylindrical housing having one part rotatable relative to the other for increasing or decreasing the variable gap which exists between the facing surfaces of said first and second clutch members when the device is in a torque setting mode wherein there is no applied torque at the input shaft;

a clutch assembly comprising first and second clutch members having opposing facing surfaces, said first clutch member, protruding shaft, and inner surface of said housing enclosing a volume comprising a clutch-assembly-domain; said volume comprising said clutch-assembly-domain varied in amount by an anti-rattle device when said two section cylindrical housing is hand rotated during the torque setting mode so that the variable gap which exists between said first and second clutch members is decreased to a point that further rotation of said housings relative to each other do not depress the anti-rattle spring.

* * * * *